Figure 1:
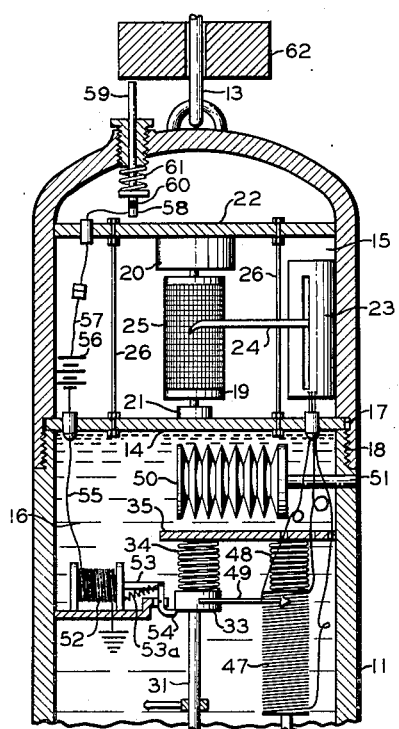

Dec. 1, 1953     B. F. WILEY     2,660,800
BOREHOLE HYDRAULIC MEASURING APPARATUS
Filed Jan. 4, 1950     2 Sheets-Sheet 1

INVENTOR.
B. F. WILEY
BY
Hudson & Young
ATTORNEYS

INVENTOR.
B. F. WILEY
BY Hudson & Young
ATTORNEYS

Patented Dec. 1, 1953

2,660,800

UNITED STATES PATENT OFFICE 2,660,800

BOREHOLE HYDRAULIC MEASURING APPARATUS

Bruce F. Wiley, Bartlesville, Okla., assignor to Phillips Petroleum Company, a corporation of Delaware Application January 4, 1950, Serial No. 136,733

12 Claims. (Cl. 33—178)

This invention relates to an apparatus especially adapted to measure the size and shape of a bore hole or the like. In one of its aspects, this invention relates to a calipering apparatus which employs a hydraulic means of operation. In another of its aspects, this invention relates to a temperature and pressure compensated hydraulic system adapted to be employed in conjunction with a bore hole measuring apparatus.

In the drilling and operation of wells, it is often desirable to determine the size and shape of a bore hole, liner casing, drilling tubing or the like. Accordingly, there have been suggested devices called "well calipers" or "logging calipers" for performing such a task. These calipering devices usually employ a plurality of extendable arms whose ends follow the contour of the bore hole as the device is drawn upwardly along the bore hole. In many such devices, the movement of the caliper arms is transmitted to a recording device by means of complex mechanical linkages including levers, gears, etc. to form a record of the contour of the walls of the bore hole. In operation, such a calipering device will be subjected to all kinds of operating conditions many of which are conducive to mechanical failure. For example, it may be desirable to caliper a bore hole containing a drilling mud which is thick and viscous enough to cause any ordinary lever or gear systems to cease functioning properly. Although attempts have been made to seal these mechanical linkages from exposure to drilling muds or other fluids, the resulting sealing mechanism is itself subject to failure. Further, conventional sealing systems usually depend upon packing gands for their effectiveness and such glands tend to decrease the sensitivity of the calipering device because of their necessarily close fit to the linkages extending through them. Obviously, a calipering apparatus which is simply constructed and which is not subject to failure due to operating conditions could be advantageously employed in the drilling and operation of wells as well as for many other purposes.

It is an object of this invention to provide a simply constructed apparatus especially adapted to measure the size and shape of a bore hole.

Another object of this invention is to provide a calipering apparatus having a hydraulic means connecting a caliper arm to a recording or indicating means.

Still another object of this invention is to provide a calipering apparatus having a temperature and/or pressure compensated hydraulic means connecting a caliper arm to a recording or indicating means in such a manner that changes in temperature and pressure in the media surrounding such apparatus do not affect the accuracy of its measurements.

Yet another object of this invention is to provide a calipering apparatus whose operation is independent of its position laterally in a bore hole.

Still another object of this invention is to provide a hydraulic means which can be automatically compensated for external changes in temperature and/or pressure and which is especially adapted to be employed in conjunction with a bore hole measuring apparatus.

Other objects and advantages of this invention will be apparent to one skilled in the art upon reading the disclosure and the claims to the invention.

Figure 2:
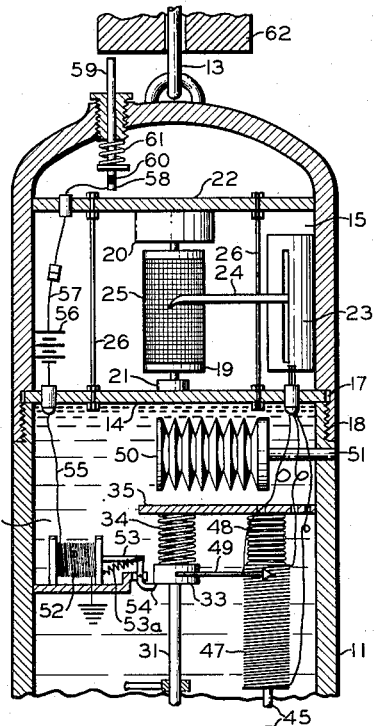
Figure 2:
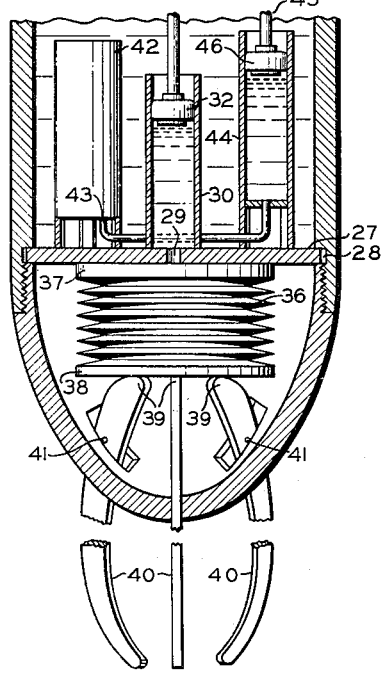
Figure 3:
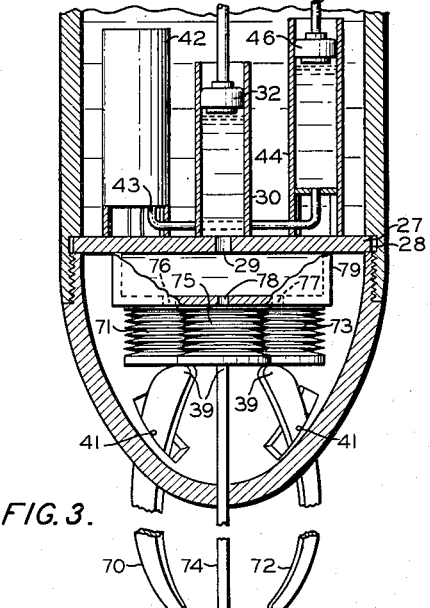
Figure 4:
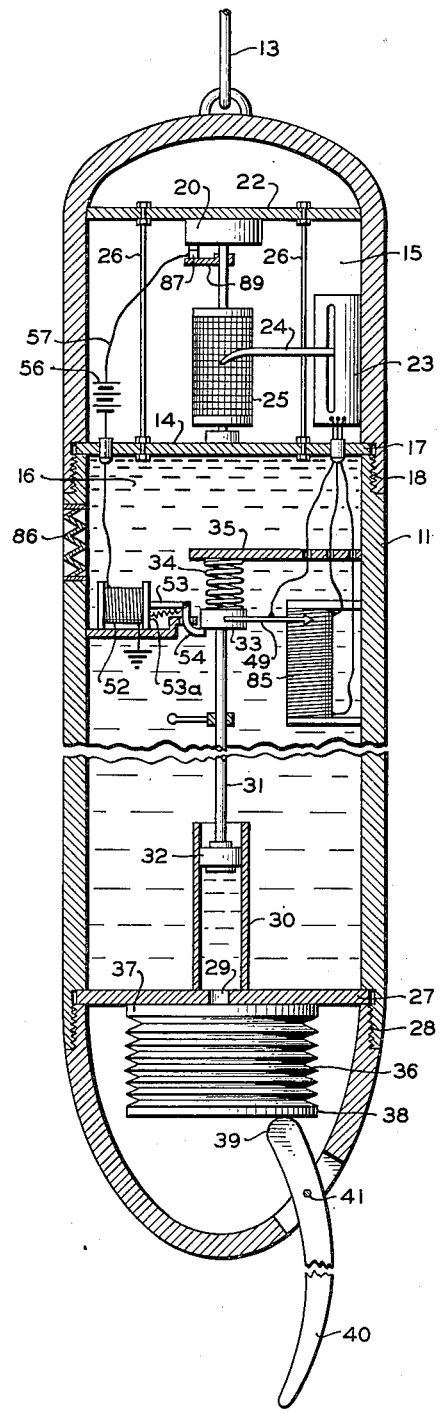
Figure 5:
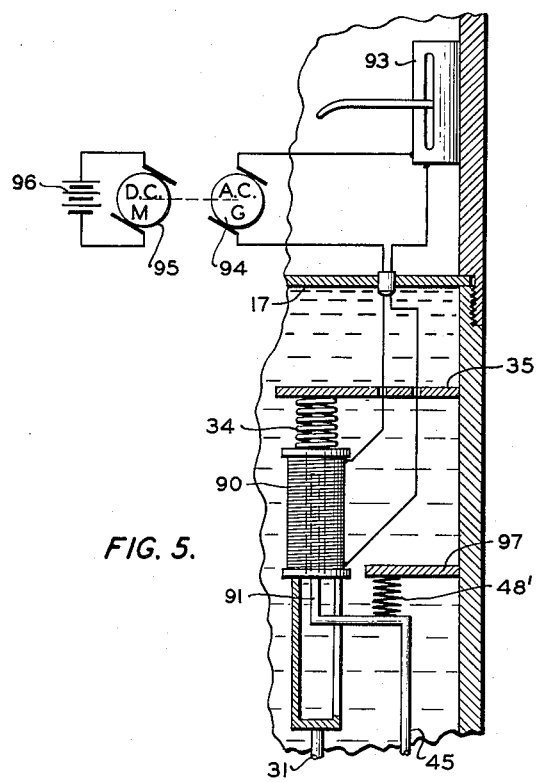
Figure 6:
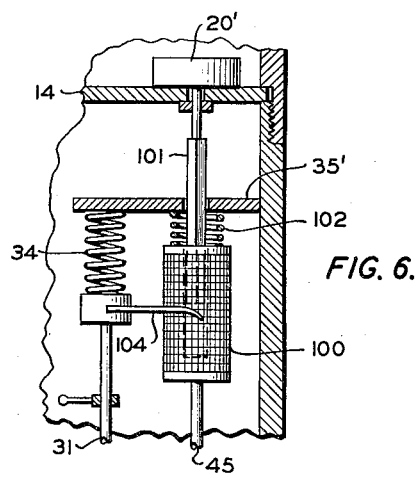

Illustrative embodiments of the apparatus of this invention are shown in the attached drawings. In the drawings, Figure 1 illustrates the apparatus of this invention in a bore hole of a well. Figure 2 is a cross-sectional view taken longitudinally of the apparatus. Figure 3 represents another embodiment of this invention. Figure 4 represents a third embodiment of this invention. Figure 5 is a modified form of telemetering transmitting apparatus. Figure 6 is a modified form of recording apparatus.

Referring more in detail to Figures 1 and 2:

A measuring apparatus 10 constructed in accordance with this invention has a casing 11 which is of suitable diameter to be freely lowered into and withdrawn from a bore hole 12 by means of cable 13. Partition 14 divides casing 11 into liquid-tight chambers 15 and 16 and can be seated in a recess 17 at screw joint 18 in casing 11. Suitable packing such as rubber seal rings, etc. (not shown) can be provided around partition 14 in recess 17 to prevent leakage. A chart drum 19 is disposed in chamber 15 and is attached to chart-driving clock 20 as shown. The assembly comprising chart drum 19 and clock 20 is supported at one end on partition 14 by bearing 21 and at the other end by member 22 in such fashion that clock 20 can revolve chart drum 19 about its longitudinal axis. Member 22 can be maintained in a fixed position relative to partition 14 by stay rods 26 or other similar means. Member 22 can be a sealed partition in casing 11 by providing a packing means (not shown) such as a rubber seal ring, etc. around its circumference between it and casing 11. In this manner, the intrusion of any fluids into chamber 15 is prevented and its contents are protected from damage.

Recording voltmeter 23 is disposed in chamber 15 and has a stylus 24 adapted to form a record on chart 25 as said chart is revolved by chart drum 19. Recording voltmeter 23 can be any type of electrical device adapted to measure the effective resistance of a variable resistor and then to translate such a measurement into a corresponding movement of a recording means such as stylus 24. Thus, the recording voltmeter can be of the self-balancing potentiometer type in which the balancing function is carried out by a small servomotor responsive to any unbalance condition that may exist in the measuring circuit.

Chamber 16 in casing 11 is defined by partition 14 and by a plate 27. Plate 27 can be situated in recess 28 of casing 11 and can have suitable seal rings etc. (not shown) to provide a liquid-tight seal. Disposed around an opening 29 in plate 27 is an expansible means responsive to changes in fluid volume which can be a cylinder 30 adapted to receive a piston 31. Piston 31 is adapted to reciprocate in cylinder 30 responsive to changes in fluid volume therein. Packing 32 can be attached to the end of piston 31 to form a slidable liquid-tight seal with the walls of cylinder 30. The other end of piston 31 is attached to a spring receiving means 33 adapted to receive a biasing means such as spring 34 therein. Support 35 is attached to the wall of casing 11 and is adapted to receive the other end of spring 34.

Communicating with cylinder 30 through opening 29 is an expansible, fluid-containing means such as bellows 36 having a head 37 attached to plate 27 and a second head or wobble plate 38 adapted to press against the ends 39 of caliper arms 40. Bellows 36 can be any type of expansible means which can be filled with a hydraulic fluid and then compressed by ends 39 of caliper arms 40 to force a portion of the fluid into cylinder 30 to thereby move piston 31. The walls of bellows 36 should be sufficiently flexible to permit considerable angular displacement of wobble plate 38 from a plane parallel to plate 27. Thus, caliper arms 40 may vary one from the other in their lateral movement from the longitudinal axis of casing 11 and wobble plate 38 should coact with ends 39 at all times.

The number of caliper arms can vary from one to as many as desired. One caliper arm 40 (see Figure 4) can be employed when it is desired to obtain a linear profile of a portion of the wall of bore hole 12. A large number of caliper arms can be employed to obtain an accurate measurement of the minimum clearance through bore hole 12. However, it is ordinarily preferred to employ three caliper arms spaced 120 degrees apart, as shown in Figures 2 and 3, in order to obtain a record of both the minimum and maximum clearance through bore hole 12. Obviously, the plane of wobble plate 38 will be determined by the position of three caliper arms and, therefore, the provision of more than three caliper arms results in a measurement of a minimum clearance in the bore hole while three caliper arms permits measuring of both maximum and minimum clearances. The term "clearance" is used to mean the cross-sectional area of the bore hole at any specified depth.

The length of caliper arms 40 can be varied to suit the size of the bore hole being measured. Preferably, the length is adjusted to permit the arms to extend from the longitudinal axis of casing 11 at an angle of about 45 degrees thereby ensuring accurate measurements of the size and shape of the bore hole. Caliper arms 40 are pivoted about axes 41 and extend into casing 11 through slots therein as shown.

A temperature compensating means can be provided to prevent thermal changes in volume of the fluid in bellows 36 and cylinder 30 from causing erroneous readings on chart 25. As shown in Figure 2, such a means includes a fluid reservoir 42 connected by conduit 43 to a fluid expansible means such as cylinder 44 which has a piston 45 therein. Piston 45 extends into cylinder 44 and has a sealing means 46 adapted to provide a slidable liquid-tight seal with the walls of cylinder 44. Piston 45 is adapted to reciprocate in cylinder 44 responsive to changes in the volume of fluid in cylinder 44 and reservoir 42. The cross-sectional area and length of cylinder 44 preferably are substantially equal to that of cylinder 30. Also, the total internal volume of reservoir 42 and cylinder 44 should equal the total internal volume of bellows 36 and cylinder 30. In this manner, a change in temperature will vary the volume of the hydraulic fluid in bellows 36 and cylinder 30 in an amount equal to the change in volume of fluid in reservoir 42 and cylinder 44 thereby moving pistons 31 and 45 a like amount. Alternatively, reservoir 42 can be incorporated into cylinder 44 by making cylinder 44 sufficiently large to hold enough liquid to properly move piston 45 to compensate for temperature changes. Hence, a thermally induced movement of piston 31 will be exactly compensated by a like movement of piston 45. If a different hydraulic fluid is used in reservoir 42 from that in bellows 36, the size and length of cylinder 44 can be adjusted according to its properties so that pistons 31 and 45 will move the same distance with a change in temperature.

Resistor 47 is attached to the opposite end of piston 45. Resistor 47 can be any type of variable resistor capable of having its effective resistance changed responsive to a movement of piston 31. Preferably, resistor 47 comprises a length of resistance wire which can be wound upon a spool or card so that a sliding contact can, in effect, vary the length thereof to thereby change its effective resistance. A spring 48 is located between support 35 and resistor 47 to bias piston 45 downwardly into cylinder 44. Contact 49 is attached to piston 31 or to spring receiving means 33 and extends to resistor 47 to form a sliding contact point thereon. Contact 49 and one end of resistor 47 are each connected to recording voltmeter 23 in such a manner that the voltmeter measures the effective resistance of resistor 47, i. e. the resistance of the length of resistance wire between contact 49 and the end of the resistor. A source of electrical current (not shown) can be connected in series with resistor 47.

In some instances it may not be desirable to employ any temperature compensating means such as reservoir 42, cylinder 44 and piston 45. In such case, they can be omitted and resistor 47 can be replaced by a resistor 85 as shown in Figure 4 which can be attached rigidly to the wall of casing 11 so that contact 49 can slide on resistor 85 to vary its effective resistance.

A pressure compensating bellows 50 can be situated in chamber 16 and is adapted to receive fluid from a point outside of casing 11 through a conduit 51. Alternatively, a flexible diaphragm 86 (see Figure 4) can form part of the wall of casing 11 in such a manner that it will impress external pressures upon the fluid in chamber 16.

Solenoid 52 is provided with a movable core 53 adapted to disengage latch 54 from its latching position with respect to spring receiving means 33. One end of the coil of wire forming solenoid 52 is connected by wire 55 to an electrical source 56 which can be a battery as shown. The opposite terminal of electrical source 56 is connected by wire 57 to contact point 58. Contact point 58 is attached to a plunger 59 and is insulated therefrom by insulating means 60. Plunger 59 is biased away from plate 22 by means of spring 61 but is adapted to be pushed toward plate 22 so that contact point 58 can contact plate 22. As illustrated in Figure 4, wire 57 can be connected to an electrical contact 87 which is insulatedly mounted on clock 20. A contact arm 89 is rotated by the shaft of clock 20 to engage contact 87 after the lapse of a predetermined time interval to ground lead 57 through arm 89 and clock 20 to metal plate 22.

In operation, caliper arms 40 are compressed inwardly as shown in Figure 2 to a position such that the entire calipering apparatus can readily be placed in a bore hole. In so doing, the ends 39 of caliper arms 40 press against wobble plate 38 of bellows 36 thereby facing liquid from bellows 36 through opening 29 into cylinder 30. The increased amount of liquid in cylinder 30 in turn forces piston 31 to compress spring 34. Latch 54 then engages spring receiving means 33 thereby retaining piston 31 in a withdrawn position with respect to cylinder 30. Caliper arms 40 will then be retained in the position shown in Figure 2. Spring 53A is adapted to push latch 54 into latching position when no current is flowing through solenoid 52.

After latching piston 31 in position as just described, the entire measuring apparatus can be readily inserted into a bore hole 12 by means of cable 13. After apparatus 10 has been lowered in bore hole 12 to a point which is below the point at which the bore hole calipering is to begin, a go-devil 62 is dropped down cable 13 to strike plunger 59 and to cause contact point 58 to touch plate 22 thereby energizing solenoid 52. The energized solenoid 52 causes latch 54 to disengage spring receiving means 33. Spring 34 will then push piston 31 into cylinder 30 to force fluid into bellows 36. The resultant extension of bellows 36 causes caliper arms 40 to extend in a lateral direction from the longitudinal axis of casing 11 until their ends strike the walls of the bore hole 10. The measuring apparatus can then be withdrawn from the bore hole by means of cable 13 at a rate which will permit the desired accuracy of measurement.

While the measuring apparatus is being withdrawn from bore hole 10, spring 34 acts through piston 31 and bellows 36 to cause caliper arms 40 to maintain a sliding contact with the walls of the bore hole. Should a caliper arm contact a portion of the bore hole wall which protrudes into the well, that caliper arm will be forced inwardly thereby compressing bellows 36 and moving piston 31 outwardly from cylinder 30. This movement causes spring 34 to compress and also moves contact 49 along resistor 47. The resultingly changed effective resistance of resistor 47 is measured by voltmeter 23 and recorded on chart 25. When the protuberance has been passed, spring 34 forces piston 31 into cylinder 30 thereby causing bellows 36 to maintain caliper arm 40 in contact with the wall of the bore hole.

Chart 25 can be calibrated in inches, feet, etc. to give a direct reading of the size of the bore hole. Since clock 20 turns chart drum 19 at a constant rate, the level at which a recording is made by recorder 23 can be readily determined by measuring the rate of withdrawal of the apparatus from the bore hole and then comparing this rate with the record on chart 25.

During its traverse of the bore hole the measuring apparatus will often encounter different temperature and pressure conditions. As an important feature of this invention, the effect of any changes in temperature upon the hydraulic fluid in cylinder 30 and bellows 36 is compensated so that the changes will not cause erroneous readings to occur. As stated, cylinder 44 preferably has an internal diameter equal to that of cylinder 30. Also, the volume of hydraulic fluid in reservoir 42, conduit 43 and cylinder 44 is preferably made equal to the volume of fluid in bellows 36 and cylinder 30 by adjusting the capacity of reservoir 42. Changes in temperature which cause a change in volume of the hydraulic fluid in bellows 36 and cylinder 30 will also cause an equal change in volume of the hydraulic fluid in reservoir 42, conduit 43 and cylinder 44. Thus, an increase in temperature will cause the hydraulic fluid in bellows 36 and cylinder 30 to expand and thereby tend to push piston 31 out of cylinder 30. The same temperature increase likewise causes the fluid in reservoir 42, conduit 43 and cylinder 44 to expand an equal volume and to push piston 45 out of cylinder 44 a distance equal to the amount piston 31 was pushed out of cylinder 30. As a result, contact 49 and resistor 47 are each moved an equal distance in the same direction but they do not move relative to each other. Thus, it is apparent that changes in temperature will not cause the measuring apparatus to yield erroneous readings.

As it is often desirable to employ the measuring apparatus of this invention in a bore hole having an elevated pressure therein, a pressure compensating bellows 50 has been provided to maintain an internal pressure in chamber 16 equal to the pressure existing locally in the bore hole. As described, chamber 16 is preferably filled with oil or other hydraulic fluid. Bellows 59 is adapted to receive fluids through conduit 51 from the bore hole surrounding the measuring apparatus. These fluids will exert a pressure internally of bellows 50 to thereby cause it to expand or contract so that the oil in chamber 16 is under a corresponding pressure. Also, bellows 50 will act as a surge chamber to accommodate changes in volume of fluid in chamber 16 due to the movements of pistons 31 and 45 in and out of cylinders 30 and 44, respectively. Many advantages flow from employing such a pressure compensating means in the oil filled chamber 16 of the measuring apparatus. Thus, local pressures, such as the hydrostatic pressure of any fluids in the bore hole, will be equalized and the only net pressure acting on the walls of bellows 36 will be that exerted by spring 34 through piston 31. As a result, bellows 36 can be constructed of a thin material and be highly responsive to movements of caliper arms 40. Also, the lack of a pressure differential across walls 11 of chamber 16 will permit their construction of a lighter material. A still further advantage is that spring 34 need not be constructed to overcome an external pressure exerted on bellows 36 and therefore, the sensitivity of the apparatus is increased. Another advantage is that pressure changes external of the measuring apparatus do not cause a change in position of bellows 36 irrespective of the position of caliper arms 40.

However, if bellows 50 is not employed, a gas-filled space should be provided in chamber 16 to permit pistons 31 and 45 to reciprocate in their cylinders.

In Figure 3, there is illustrated a measuring apparatus similar to that shown in Figure 2 except that bellows 36 of Figure 2 has been replaced by an individual bellows for each caliper arm. Thus, caliper arm 70 coacts with bellows 71, caliper arm 72 coacts with bellows 73, and caliper arm 74 coacts with bellows 75. Bellows 71, 73 and 75 have openings 76, 77 and 78 into a common pressure chamber 79. Chamber 79 communicates with cylinder 30 through opening 29 similarly to bellows 36 in Figure 2. Alternatively, the individual bellows can open directly into cylinder 30 thereby eliminating pressure chamber 79. The remaining elements shown in Figure 3 are correspondingly numbered to those of Figure 2 and have respectively similar functions.

In operation, the apparatus of Figure 3 will function in a manner similar to that of Figure 2 except that an individual bellows will coact with each caliper arm in its lateral movements from casing 11. In this manner, the movements of caliper arms 70, 72 and 74 can be more accurately recorded, particularly when the measuring apparatus deviates laterally from the center of the bore hole whereby one caliper arm is greatly extended and another is only slightly extended from casing 11. The expansion and contraction of any individual bellows is independent of the position of any caliper arms except the one coacting with it and it is not necessary for one side of the bellows to expand or contract differently from the other sides as is necessary with bellows 36 of Figure 2. Further, any number of caliper arms and individual bellows can be provided and the position of each arm will help determine the position of piston 31 irrespective of the position of the other arms.

It should be observed that recording means 23 is actuated in response to the position of contact 49 on either variable resistor 47 or 85. Thus, resistors 47 and 85 serve as telemetering transmitting devices to transmit a signal to a second remotely located recorder.

Further, resistor 47 can be replaced by other means for determining the relative position of piston 31. Thus an inductance coil 90, Figure 5, can be attached to the upper end of piston 31 to move up and down therewith. A core 91 is attached to the upper end of piston 45 so as to move in or out of coil 90 depending upon the relative positions of pistons 31 and 45. A compression spring 48' which is suspended from a plate 97 serves to bias piston 45 and core 91 in a downward position. An inductance measuring device 93 having an A.-C. source can be substituted for voltmeter 23. This A.-C. source can be provided by a generator 94 which is rotated by a small motor 95 which in turn is energized from a battery 96. As another alternative resistor 47 can be replaced by a chart 100, Figure 6, which is mounted for rotation on piston 45. A clock 20' is mounted on plate 14 and rotates chart 100 by a square drive shaft 101 which engages chart 100 in a slidable manner. A compression spring 102 biases chart 100 in a downward position. Thus, chart 100 is rotated continuously by clock 20' but is free to move upward or downward in response to movement of piston 45. A pen arm 104 is attached to the upper end of piston 31 to record the relative position of piston 31 with respect to piston 45 on chart 100.

In the specification and claims, the term "bore hole" is meant to denote any hole, conduit, well liner, casing or the like which has surfaces forming sides thereto. Obviously, the apparatus of this invention, although particularly applicable in measuring the bore hole of a well, can be employed to caliper a conduit, e. g. a still tube, or the like. It also should be understood that the term "fluid" as used throughout the specification and claims is meant to denote a hydraulic fluid, that is an incompressible fluid.

While the invention has been described in connection with present, preferred embodiments thereof, it is to be understood that this description is illustrative only and is not intended to limit the invention, the scope of which is defined by the appended claims.

1. A measuring apparatus adapted to measure the size of a bore hole comprising, in combination, a casing having a liquid filled chamber, a first cylinder attached to a wall of said chamber and extending inwardly therein, a first piston adapted to reciprocate in said first cylinder responsive to changes in fluid volume therein, means for biasing said first piston into said first cylinder, a hydraulic fluid reservoir connected to a second cylinder disposed parallel to said first cylinder, a second piston adapted to reciprocate in said second cylinder responsive to changes in fluid volume in said reservoir, said reservoir and said second cylinder being so constructed as to move said second piston responsive to temperature changes so as to compensate for thermally induced movements of said first piston, means adapted to indicate the relative position of said first piston with respect to said second piston, an expansible hydraulic fluid-containing means connected to said first cylinder, a plurality of caliper arms adapted to swing laterally of said casing to bring the outer ends of said arms in contact with the walls of said bore hole, said caliper arms also coacting with said fluid-containing means to cause fluid therein to move responsive to lateral movements of said arms thereby varying the position of said first piston with respect to said second piston.

2. A measuring apparatus adapted to measure the size of a bore hole comprising, in combination, a casing closed at one end and having a hydraulic fluid-containing chamber therein, a first cylinder attached to a wall of said chamber and extending inwardly therein, a first piston adapted to reciprocate in said first cylinder responsive to changes in fluid volume in said first cylinder, a hydraulic fluid reservoir connected to a second cylinder disposed in said chamber parallel to said first cylinder, said second cylinder having a cross-sectional area equal to that of said first cylinder, a second piston adapted to reciprocate in said second cylinder responsive to changes in fluid volume in said reservoir, means adapted to indicate the relative position of said first piston with respect to said second piston, an expansible hydraulic fluid-filled bellows positioned externally of said chamber and connected internally to said first cylinder, the total internal volume of said bellows and said first cylinder being equal to the total internal volume of said reservoir and said second cylinder, a plurality of caliper arms each pivotally mounted to said casing and adapted to swing laterally of said casing thereby enabling the outer ends of said arms to contact the walls of said bore hole, said caliper arms being adapted to coact with and compress said bellows when said arms are forced inwardly towards the center of said bore hole whereby the fluid in said bellows is forced into said first cylinder to move said first piston with respect to said second piston, and a pressure compensating means adapted to impress pressure changes in said bore hole upon the fluid in said chamber in order to maintain a pressure therein equal to that of said bore hole.

3. A measuring apparatus adapted to measure the size of a bore hole comprising, in combination, a cylindrical casing closed at one end and having a plurality of slots at the other end, a plate extending across said casing to form a fluid-tight, oil-filled chamber in said casing, a first hydraulic fluid filled cylinder attached to said plate and extending inwardly into said chamber, a first piston adapted to reciprocate in said first cylinder responsive to changes in fluid volume in said first cylinder, a spring biasing said first piston into said first cylinder, an enclosed hydraulic fluid reservoir disposed in said chamber and having a conduit means connecting it to a second cylinder disposed in said chamber parallel to said first cylinder, said second cylinder having a cross-sectional area equal to that of said first cylinder, a second piston adapted to reciprocate in said second cylinder responsive to changes in fluid volume in said reservoir, a variable resistor attached to said second piston, a spring biasing said second piston into said second cylinder, means attached to said first piston to vary the effective resistance of said resistor responsive to changes in position of said first piston, means for measuring said effective resistance of said resistor, an expansible bellows connecting internally to said first cylinder, the total internal volume of said bellows and said first cylinder being equal to the total internal volume of said reservoir and said second cylinder, a plurality of caliper arms each pivotally mounted in one of said slots in said casing and adapted to swing laterally of said casing to bring the outer ends of said arms in contact with the walls of said bore hole, said caliper arms being constructed and situated so as to compress said bellows as said arms are forced inwardly towards the center of said bore hole, the fluid in said bellows being forced into said first cylinder to cause said first piston to vary the effective resistance of said resistor, and a pressure compensating means disposed in said chamber responsive to pressure changes in said bore hole.

4. A measuring apparatus adapted to measure the size of a bore hole comprising, in combination, a cylindrical casing closed at one end and having a plurality of slots at the other end, a partition across said casing to form a first hydraulic fluid-tight chamber in said closed end of said casing, a plate extending across said casing to form a second fluid-tight oil-filled chamber in said casing immediately adjacent said first chamber, a first hydraulic fluid filled cylinder attached to said plate and extending inwardly into said second chamber, a first piston adapted to reciprocate in said first cylinder responsive to changes in volume of fluid in said first cylinder, an enclosed hydraulic fluid reservoir disposed in said second chamber and connected to a second cylinder disposed in said second chamber parallel to said first cylinder, said second cylinder having a cross-sectional area equal to that of said first cylinder, a second piston adapted to reciprocate in said second cylinder responsive to changes in volume of fluid in said reservoir, a variable resistor attached to said second piston, a contact arm attached to said first piston and adapted to slidably contact said resistor to vary the effective resistance of said resistor responsive to changes in volume of fluid in said first cylinder, a recording voltmeter disposed in said first chamber to measure the effective resistance of said resistor, a longitudinally expansible bellows attached to said plate externally of said second chamber and connecting through an opening in said plate to said first cylinder, the total internal volume of said bellows and said first cylinder being equal to the total internal volume of said reservoir and said second cylinder, said bellows having a wobble plate across its end disposed parallel to said plate, a plurality of caliper arms each pivotally mounted in one of said slots in said casing and adapted to swing laterally of said casing to bring the outer ends of said arms in contact with the walls of said bore hole, said caliper arms having inner ends bearing against said wobble plate of said bellows and adapted to compress said bellows as said arms are forced inwardly towards the center of said bore hole thereby forcing the fluid in said bellows into said first cylinder to cause said first piston to vary the effective resistance of said resistor, and a pressure compensating bellows disposed in said second chamber and responsive to pressure changes in said bore hole.

5. A hydraulic bore hole measuring system comprising an oil-filled chamber, a first cylinder attached to one wall of said chamber and extending inwardly thereof, a first piston adapted to reciprocate in said first cylinder responsive to changes in fluid volume in said first cylinder, an enclosed hydraulic fluid reservoir disposed in said chamber and having a conduit means connecting it to a second cylinder disposed in said chamber parallel to said first cylinder, said second cylinder having a cross-sectional area equal to that of said first cylinder, a second piston adapted to reciprocate in said second cylinder responsive to changes in liquid volume in said reservoir, a variable resistor attached to said second piston, a contact arm attached to said first piston and adapted to slidably contact said resistor so that a change in position of said first piston responsive to a change in volume in said first cylinder will cause said contact arm to vary the effective resistance of said resistor, means for measuring the effective resistance of said resistor, a longitudinally expansible bellows attached externally to said chamber and connecting through the wall thereof to said first cylinder, the total internal volume of said bellows and said first cylinder being equal to the total internal volume of said reservoir and said second cylinder, means for varying the volume of said bellows responsive to changes in size of the bore hole being measured, and a pressure compensating bellows disposed in said chamber responsive to pressure changes external of said chamber thereby maintaining a pressure in said chamber equal to the pressure external of said chamber.

6. A hydraulic bore hole measuring system comprising a liquid-filled chamber, a first cylinder situated in said chamber, a first piston adapted to reciprocate in said first cylinder responsive to change in fluid volume in said first cylinder, a hydraulic fluid reservoir disposed in said chamber and connected to a second cylinder disposed in said chamber parallel to said first cylinder, said second cylinder having a cross-sectional area equal to that of said first cylinder, a second piston adapted to reciprocate in said second cylinder responsive to changes in liquid volume in said reservoir, means adapted to indicate the position of said first piston with respect to said second piston, an expansible hydraulic fluid-containing means attached externally to said chamber and connected to said first cylinder, the total internal volume of said expansible fluid-containing means and said first cylinder being equal to the total internal volume of said reservoir and said second cylinder, and means for varying the volume of said expansible fluid containing means responsive to changes in size of the bore hole being measured.

7. A hydraulic bore hole measuring system comprising a chamber, a first cylinder situated in said chamber, a first piston adapted to reciprocate in said first cylinder responsive to changes in fluid volume in said first cylinder, means biasing said first piston into said first cylinder, a hydraulic fluid reservoir connected to a second cylinder disposed parallel to said first cylinder, said second cylinder having a cross-sectional area equal to that of said first cylinder, a second piston adapted to reciprocate in said second cylinder responsive to changes in volume in said reservoir, means for indicating the position of said first piston with respect to said second piston, an expansible hydraulic fluid-containing means external of said chamber and connected to said first cylinder, the total internal volume of said fluid-containing means and said first cylinder being equal to the total internal volume of said reservoir and said second cylinder, and means for varying the volume of said expansible fluid-containing means responsive to changes in size of the bore hole being measured.

8. A hydraulic bore hole measuring system comprising a chamber, a first hydraulic fluid filled cylinder situated in said chamber, a first piston adapted to reciprocate in said first cylinder responsive to changes in fluid volume in said first cylinder, a second hydraulic fluid filled cylinder having a second piston adapted to reciprocate in said second cylinder responsive to changes in volume in its actuating fluid, the relative cross-sectional areas of and total fluid volumes communicating with said first and second cylinders being such that said first and second pistons are moved like amounts by equal temperature changes in the fluids communicating with said cylinders, means for indicating the position of said first piston with respect to said second piston, expansible means situated externally of said chamber and connected to said first cylinder, and means for varying the volume of said expansible means responsive to changes in size of the bore hole being measured.

9. The combination in accordance with claim 8 wherein said means for indicating the position of said first piston with respect to said second piston comprises a variable resistor secured to one of said pistons, a contactor secured to the other of said pistons and adapted to engage said resistor, and means for measuring the effective resistance of said resistor as determined by the position of said contactor on said resistor.

10. The combination in accordance with claim 8 wherein said means for indicating the position of said first piston with respect to said second piston comprises an inductance coil secured to one of said pistons, a core of magnetic material secured to the other of said pistons whereby said core is movable within said inductance coil in response to the relative position of said first and second pistons, and means to measure the effective impedance of said inductance coil as determined by the position of said core therein.

11. The combination in accordance with claim 8 wherein said means for indicating the position of said first piston with respect to said second piston comprises a chart mounted on one of said pistons for movement therewith, a marker mounted on the other of said pistons for movement therewith whereby said marker engages said chart to record the relative position of said first and second pistons, means to move said chart at a predetermined speed past said marker whereby a continuous record of the relative position of said pistons is provided by said marker on said chart.

12. The combination in accordance with claim 8 wherein said means for varying the volume of said expansive means comprises a plurality of longitudinally expansible bellows each attached externally to said chamber and communicating with said first cylinder, a plurality of caliper arms each pivotally mounted in said chamber and adapted to swing laterally of said chamber to bring the outer ends of said arms in contact with the walls of said bore hole, the inner ends of said caliper arms each being adapted to engage one of said expansive bellows.

BRUCE F. WILEY.

References Cited in the file of this patent

UNITED STATES PATENTS

| Number | Name | Date |
|---|---|---|
| 1,676,248 | Bryant | July 10, 1928 |
| 2,102,080 | Kinley | Dec. 14, 1937 |
| 2,265,098 | Bettis | Dec. 2, 1941 |
| 2,267,110 | Kinley et al. | Dec. 23, 1941 |
| 2,324,217 | Knauth | July 13, 1943 |
| 2,324,865 | Milligan | July 20, 1943 |
| 2,374,154 | Moore | Apr. 17, 1945 |
| 2,392,357 | Bay | Jan. 8, 1946 |
| 2,399,305 | Agnew et al. | Apr. 30, 1946 |
| 2,423,609 | Middleton et al. | July 8, 1947 |
| 2,446,632 | Cahill et al. | Aug. 10, 1948 |

FOREIGN PATENTS

| Number | Country | Date |
|---|---|---|
| 584,673 | Germany | Sept. 22, 1933 |